(No Model.)  
2 Sheets—Sheet 1.

H. DEITZ.
CAR COUPLING.

No. 521,433.   Patented June 12, 1894.

WITNESSES:  
C. J. Roelander  
Chas. E. Dawson

INVENTOR  
Henry Deitz  
BY  
A. J. O'Brien  
ATTORNEY (No Model.) 2 Sheets—Sheet 2.
H. DEITZ.
CAR COUPLING.
No. 521,433. Patented June 12, 1894.
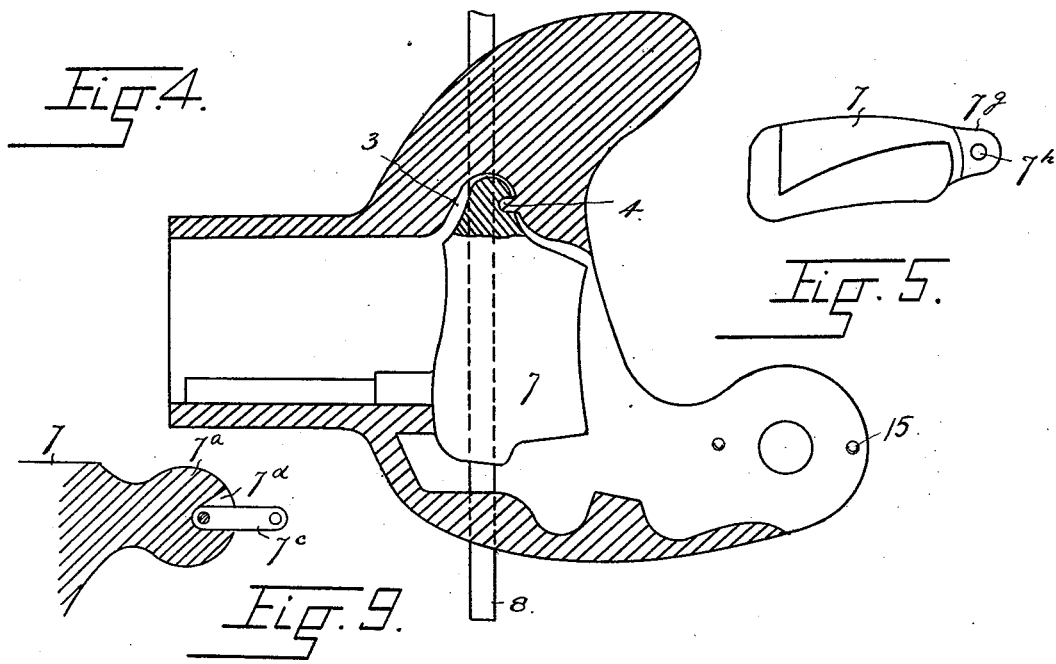
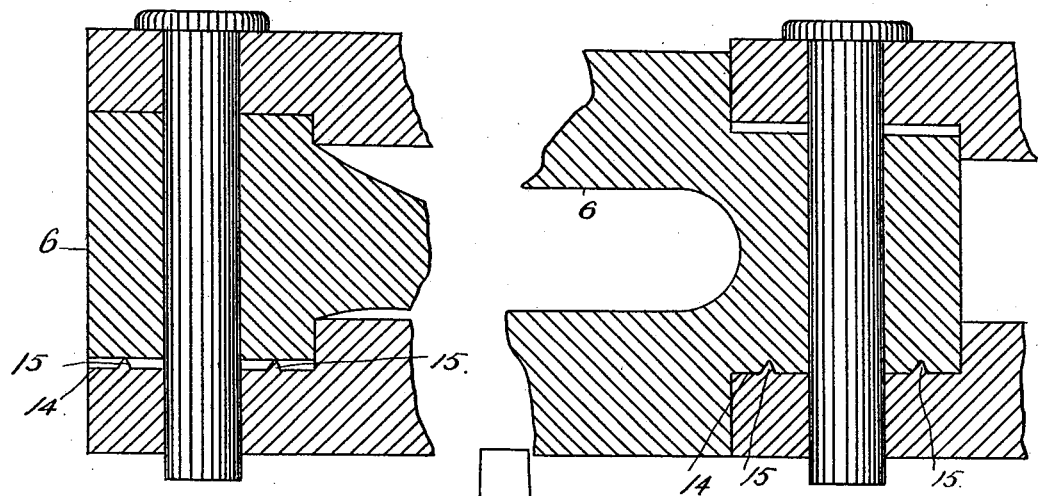
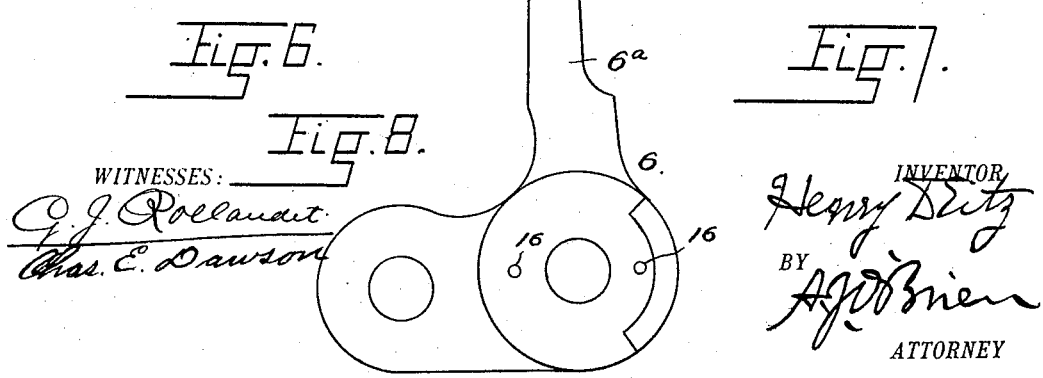
WITNESSES:
O. J. Rollandet
Chas. E. Dawson
INVENTOR
Henry Deitz
BY A. J. O'Brien
ATTORNEY
THE NATIONAL LITHOGRAPHING COMPANY,
WASHINGTON, D. C.

UNITED STATES PATENT OFFICE.

HENRY DEITZ, OF DENVER, COLORADO.

CAR-COUPLING.

SPECIFICATION forming part of Letters Patent No. 521,433, dated June 12, 1894.

Application filed July 5, 1893. Serial No. 479,673. (No model.)

*To all whom it may concern:*

Be it known that I, HENRY DEITZ, a citizen of the United States of America, residing at Denver, in the county of Arapahoe and State of Colorado, have invented certain new and useful Improvements in Car-Couplers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in automatic car couplers, and consists of the features hereinafter described and claimed.

Figure 1:
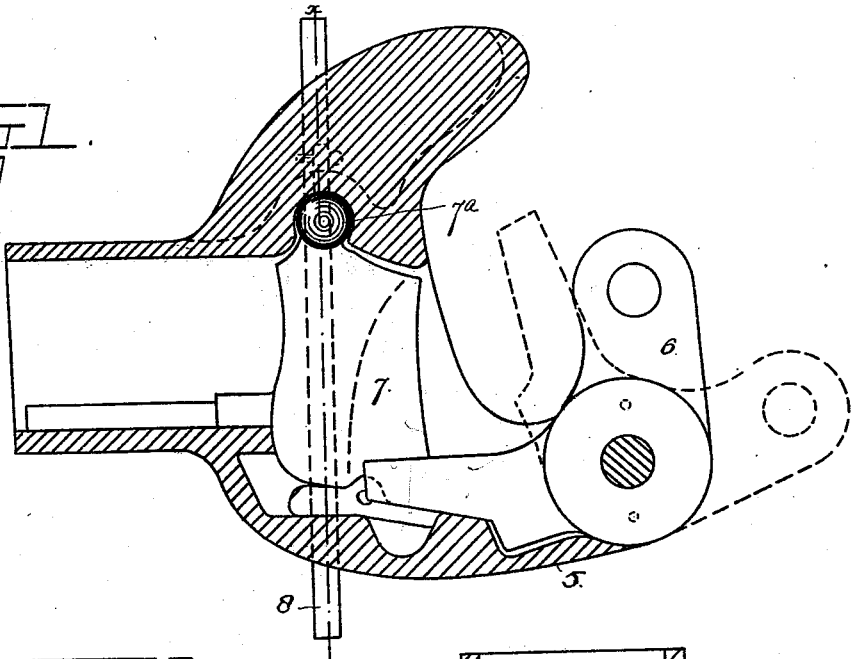
Figure 2:
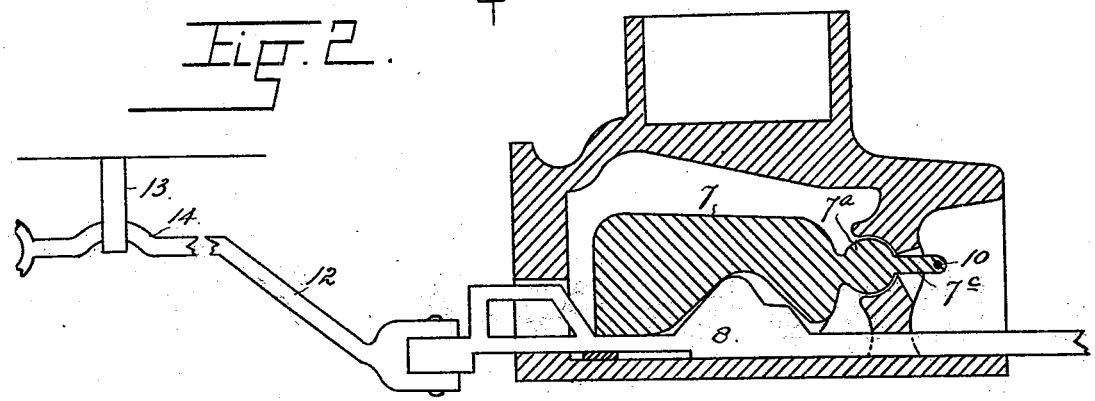
Figure 3:
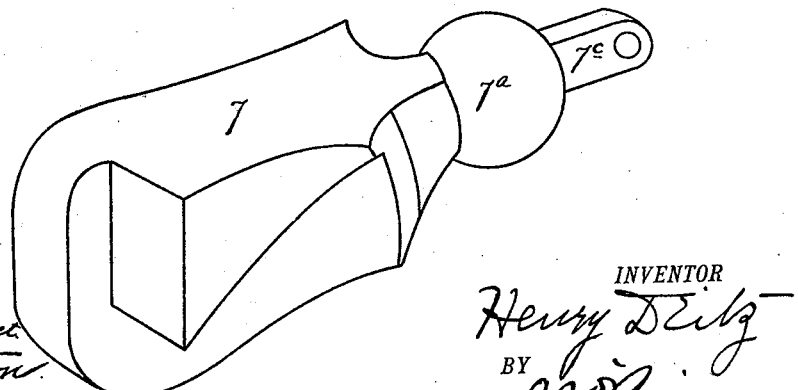

In the accompanying drawings which form a part hereof, Figure 1 is a horizontal section of the drawhead provided with my improvements. Fig. 2 is a vertical section taken on the line $x$—$x$, Fig. 1. Fig. 3 is a detail view in perspective of the locking dog. Fig. 4 is a horizontal section taken through the drawhead, and showing a modified form of locking dog. Fig. 5 is a detail view of the modified form of the dog. Figs. 6 and 7 are sectional views illustrating the means for temporarily locking the coupling hook in the open position. Fig. 8 is a detail plan view of the coupling hook. Fig. 9 is a fragmentary sectional view illustrating another form of locking dog.

Similar reference characters indicating corresponding parts or elements of the mechanism in the several views, let the numeral 5 designate the draw-head provided with the coupling hook 6, the locking dog 7, and the transverse bar 8 for manipulating the locking dog. The bar 8 is of substantially the same construction as that shown in my previous application, Serial No. 476,323.

The chief improvements which will be set forth in this application relate to the locking dog and the coupling hook.

The dog is provided with a ball $7^a$ at one extremity which is received in a suitable socket formed in one side of the draw-head. This ball extremity of the dog is provided with a short arm $7^c$ which projects through an opening formed in the side of the draw- head and is secured in place by a suitable key 9 passed through an aperture 10 formed in the outer extremity of said arm. The opening 8 is enlarged externally, as shown, to allow the arm $7^c$ perfect freedom of movement as the dog is raised and lowered through the action of the transverse bar 8, or of the tail piece of the coupling hook. Instead of forming the arm $7^c$ integral or rigid with the ball of the dog, it may be separate therefrom and connected therewith by inserting one extremity of the arm in a socket $7^d$ formed in the ball, and fastening the arm by passing a rivet or pin through coinciding apertures formed in the ball and the extremity of the arm. The socket $7^d$ allows the dog to move independently of the arm $7^c$ which is simply employed to prevent the dog from moving out of its proper place.

In Figs. 4 and 5, still another form of locking dog is shown. In this case one extremity $7^g$ is provided with a recess $7^h$ which is adapted to receive a projection 4 formed upon the draw-head and projecting into the recess 3 for the reception of the extremity of the locking dog. This recess 3 is so fashioned that when the extremity $7^g$ of the dog is inserted therein, the lug 4 will slip into the recess $7^h$; then by placing the transverse bar in position, or even without its aid, the dog will be locked in place and maintained in operative relation with the other parts. To the transverse bar 8 outside of the draw-head is attached an arm 12, the outer extremity of which occupies a position near the outside of the car whereby the transverse bar may be moved without going between the cars. The arm 12 is supported in a stirrup 13 attached to the car, and is provided with a bend 14 which engages the stirrup when the dog is in the locking position, thus enabling the trainman to determine at a glance, the position of the dog.

I will now describe my improved means for temporarily locking the pivoted coupling hook in the open position. Much difficulty has been experienced heretofore with this class of couplers by reason of the fact that the coupling hook, after the cars are uncoupled, is very liable through the vibration resulting from the movement of the cars, to assume a closed or partly closed position. When an attempt is made to couple the cars under such circumstances the draw-head having the closed or partly closed coupling hook cannot receive the hook of the draw-head belonging to the approaching or opposite car. This condition of affairs often results in breaking a draw-head. I overcome this defect by providing that part 14 of the draw-head upon which the coupling hook rests, or the lower arm of the forked portion, with one or more projections 15 which engage counterpart recesses 16 formed in the adjacent surface of the coupling hook, when the latter is thrown to the uncoupled position. By this means the hook is locked in the open position and will not be disturbed by the jars and vibrations incident to the use of the car. When, however, the coupling hook of the opposite draw-head engages the tail piece 6ª of the unlocked hook, the latter moves readily to the locked position, being lifted from engagement with the projections 15 of the drawhead.

Having thus described my invention, what I claim is—

1. In a car coupler, the combination with the draw-head and coupling hook, of the locking dog terminating at one extremity in a ball or spherical shaped projection engaging a suitable socket formed in the draw-head, the ball extremity being provided with an arm which projects through an opening in the side of the draw-head, the dog being held in place by passing a suitable key through an aperture in the arm extremity, substantially as described.

2. In a car coupler, the combination with the draw-head, the locking dog and the transverse bar for manipulating the same, of an arm connected with said bar and provided with a suitable support attached to the car, said arm being provided with a short bend which normally engages the said support, substantially as described.

3. The combination with the draw-head, the coupling hook and the transverse bar, of the locking dog having one extremity engaging a suitable socket formed in the draw-head and suitable means for retaining the dog in operative relation with the other parts, substantially as described.

4. The combination of the drawhead, and the pivoted coupling hook, means for temporarily locking the coupling hook in the open position in the draw-head, said means consisting of one or more projections formed on one part and adapted to enter counterpart recesses formed in the other part, the locking dog having one extremity engaging a suitable socket formed in the draw-head, means for retaining the dog in operative relation with the other parts, and the transverse bar for manipulating the dog, substantially as described.

In testimony whereof I affix my signature in the presence of two witnesses.

HENRY DEITZ.

Witnesses:
CHARLES ELLIOTT,
J. R. ZEARING.